United States Patent [19]

Sakaira et al.

[11] 4,376,726

[45] Mar. 15, 1983

[54] METHOD OF MANUFACTURING COMPOSITION FOR BONDED MAGNETS

[75] Inventors: Tadashi Sakaira, Katano; Hideyuki Yamada, Kadoma; Tamotsu Wakahata, Katano, all of Japan

[73] Assignee: Matsushita Electric Industrial Co., Ltd., Osaka, Japan

[21] Appl. No.: 244,322

[22] Filed: Mar. 16, 1981

[30] Foreign Application Priority Data

Mar. 17, 1980 [JP] Japan ................................ 55-33796

[51] Int. Cl.³ ............................ H01B 1/06; B01J 2/16

[52] U.S. Cl. ........................................ 252/519; 264/118; 264/122; 264/DIG. 51; 252/511; 252/521

[58] Field of Search ....... 264/118, 122, 111, DIG. 51; 252/519, 511, 521

[56] References Cited

U.S. PATENT DOCUMENTS

| | | | |
|---|---|---|---|
| 3,024,392 | 3/1962 | Baerman | 264/111 |
| 4,012,348 | 3/1977 | Chelland | 264/122 |
| 4,113,480 | 9/1978 | Rivers | 264/111 |
| 4,269,800 | 5/1981 | Sommer | 264/111 |

*Primary Examiner*—James R. Hall

*Attorney, Agent, or Firm*—Wenderoth, Lind & Ponack

[57] ABSTRACT

An improved method of manufacturing a composition for bonded magnets in which deterioration of the composition due to heat is prevented, while uniform dispersion of ferrite powder is achieved for stabilization of physical properties and various characteristics of the resultant bonded magnets.

9 Claims, 1 Drawing Figure

METHOD OF MANUFACTURING COMPOSITION FOR BONDED MAGNETS

BACKGROUND OF THE INVENTION

The present invention relates to a method of manufacturing a composition for magnets made of resinous material (referred to as a bonded magnet hereinbelow).

Conventionally, the composition material for bonded magnets, i.e. resin bonded magnets, is generally prepared by mixing ferrite powder into matrices, for example, of rubber, plastics or the like, and in many cases, such known composition contains 80 to 90% by weight of ferrite powder.

For kneading the composition material as described above, devices such as kneaders, rolls, etc. are available. However, since each of such devices is arranged to provide the kneading effect by subjecting the composition material to a compression or shearing during the kneading, a very high abrasion tends to occur at metallic surfaces of the device which are brought into contact with said composition material. Thus, each time the kneading is repeated, the compressing and shearing performances of the device are deteriorated, with consequent deviations of kneading conditions in a continuous operation. This results in such disadvantages that the bonded magnets prepared thereby have unstable magnetic characteristics largely deviating from one kneading lot to another. Furthermore, owing to the abrasion as described above, countermeasures such as replacement of tanks, blades, rolls, etc. for the kneading devices, or application of surface treatments and the like become necessary. This gives rise to a considerably large economical loss.

Moreover, since the ferrite powder is present in a high ratio in the composition, the dispersion of the ferrite powder and matrices in the composition tends to be uneven. This requires strict maintenance of specific conditions during the kneading, requiring a skilled worker to attend the kneading operation at all times, with consequent difficulties for automation of the work. Furthermore the matrices of resin material are liable to be deteriorated and lose their strength due to a long period of time required for uniform kneading.

Moreover, owing to the fact that a small amount of additive contained in the composition material is apt to scatter or adhere to a mixing vessel during the mixing thereof with the ferrite powder and matrices, mixing through strict measurement is difficult to achieve. This results in significantly large deviations in the composition.

SUMMARY OF THE INVENTION

Accordingly, an essential object of the present invention is to provide an improved method of manufacturing a composition for bonded magnets in which deterioration of a composition material to be kneaded due to heat is prevented, while uniform dispersion of ferrite powder is achieved for stabilization of physical properties and various characteristics of the resultant bonded magnets.

Another important object of the present invention is to provide an improved method of manufacturing a composition for bonded magnets as described above which is simple and can be readily introduced into mass production of the composition.

In accomplishing these and other objects according to one preferred embodiment of the present invention, there is provided an improved method of manufacturing a composition for bonded magnets. This method includes the steps of charging a composition including ferrite powder and matrices of resin material to be kneaded, into a kneading apparatus structurally closed, at a volume ratio below 90%, forming a fluidized layer in the kneading apparatus by a stirring blade member for effecting kneading within a temperature range higher than the melting point or softening point of the resin material, and subsequently granulating the composition within a tank having a cooling and stirring function and a crushing function at temperatures below the melting point or softening point of the resin material.

By the process according to the present invention as described above, an improved manufacturing method of a composition for bonded magnets has been advantageously presented without deterioration of the composition material. Furthermore, the bonded magnets have stable physical properties and characteristics.

BRIEF DESCRIPTION OF THE DRAWING

These and other objects and features of the present invention will become apparent from the following description taken in conjunction with the preferred embodiments thereof with reference to the accompanying drawing, in which is a diagram explaining the kneading of a composition for a bonded magnet according to the present invention. In the drawing point A represents a temperature higher than the melting point of the resin matrices by 10° C. Point B denotes the point where the above temperature is stabilized and the whole composition uniformly reaches said temperature, and also where stirring blade is changed over from a high speed rotation to a low speed rotation. Point C shows the point where the temperature of the composition is lowered through the low speed rotation, and point D represents the temperature for discharging the composition material from a tank.

DETAILED DESCRIPTION OF THE INVENTION

Figure 1:
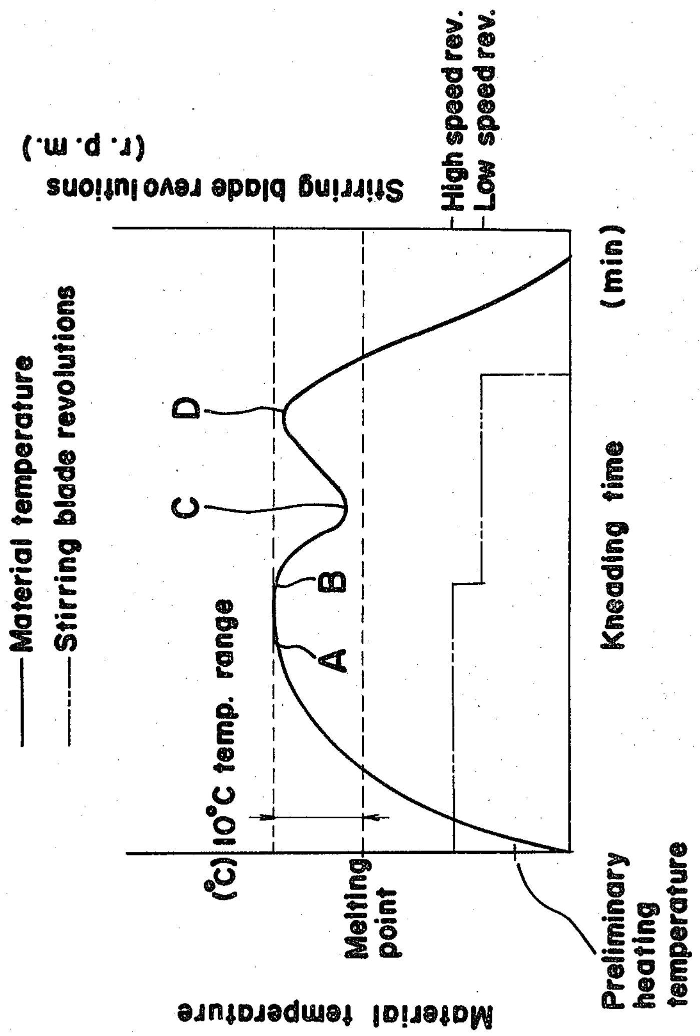

According to the present invention, for continuously manufacturing a composition for a bonded magnet, with simultaneous stabilization of physical properties and characteristics of the composition material to be kneaded, the kneading is carried out by a kneading apparatus in which the composition is subjected to shearing and fluidization in a structurally closed container. This is accomplished by a stirring blade having a kneading function in a manner so as to prevent thermal deterioration of matrices such as rubber, plastics, etc. and also to achieve uniform dispersion of ferrite powder and matrices.

In the case where the ferrite powder, matrices and a small amount of additive are charged into the apparatus, since many of such additives are composed of compositions of more than two kinds, with composition ratio thereof being less than 5% by weight, a predetermined amount of the additive is preliminarily accommodated in a bag having a good compatibility or mutual solubility with respect to the matrices. This permits strictly accurate measurement, wherein one bag of additive is mechanically charged into the kneading apparatus per batch of kneading for the stabilization of workability and weighing.

Referring now to FIG. 1, the kneading process of the composition material thus introduced into a kneading apparatus will be described hereinbelow.

In the first place, for the reduction of kneading time, and also prevention of thermal deterioration of the matrices, the kneading apparatus is preliminarily heated up to a temperature lower than the melting point of the matrices with respect to a composition having a high melting point.

Subsequently, the composition is charged into the apparatus and the temperature of the composition is rapidly raised through high speed rotation of a stirring blade up to a point A. This state is continued for approximately several minutes (between points A and B) until the ferrite powder and matrices are uniformly dispersed.

Thereafter, for preventing the thermal deterioration of the matrices, the revolutions of the stirring blade are reduced down to less than 80% of the revolutions at the high speed rotation so as to lower the temperature of the composition to the point C, for sufficient kneading up to the point D.

The composition material kneaded in the above described manner is discharged from the container, within the temperature from below the melting point of the matrices to the temperature higher than said melting point by 10° C., and charged into a tank having a cooling and stirring function and a crushing function for granulation.

Hereinbelow, EXAMPLES are inserted for the purpose of illustrating the present invention, without any intention of limiting the scope thereof.

EXAMPLE 1

In the composition material, there were employed strontium ferrite having an average particle diameter of about 1μ for the ferrite powder, 6-nylon having a melting point of 215° C. and molecular weight of 23,000 for the matrices, and metallic soap for the additive, with the use of lubricant of phthalate as a plasticizer. The above additive and lubricant, weighed and mixed, were preliminarily packed into a bag of polyamide resin 0.2 mm in thickness and 400 $cm^3$ in volume.

86 weight % of the above strontium ferrite, 13 weight % of polyamide resin, and the additive (0.5 weight % of phthalate and 0.5 weight % of metallic soap) packed into the bag of polyamide resin were weighed and mixed to occupy 88% of the volume of the tank of the kneading apparatus.

For the kneading apparatus, a commercially available Henschel mixer (made by Henschel Werke G.m.b.H. Kassel, West Germany) was employed. The tank preliminarily heated up to a temperature of 120° C., the strontium ferrite and polyamide resin subjected to automatic weighing, and the additive packed in the bag of polyamide resin were mechanically charged into the tank. Thereafter, the tank was completely closed, and the stirring blade was rotated at a high speed of 1,100 r.p.m. until the temperature of the composition reached 220° C. and was further stabilized. Upon stabilization of the temperature, the stirring blade speed was lowered to 700 r.p.m. at which it was operated until the temperature of the composition reached 216° C. and was further stabilized. Subsequently, the composition thus treated was discharged out of the tank and was granulated by a device having a cooling function and a crushing function (i.e. a known cooling device mounted on the Henschel mixer).

On the other hand, polypropylene was employed for the bag in which the additive is accommodated, and the kneading was effected in the same manner as described above for the granulation.

Furthermore, the amount of the composition material to be treated, the number of revolutions of the stirring blade at the low speed rotation, and the temperature to be reached at the high speed rotation of the stirring blade, etc. were varied. The kneading was carried out in the same manner as described earlier for the granulation.

The composition material thus granulated was subjected to injection molding in a mold having a magnetic field of 10,000 (Oe), and a sample bonded magnet of 3 mm in height, 10 mm in width and 10 mm in depth was obtained. The magnetic characteristics of the magnet were measured.

Moreover, for the measurement of mechanical strength, the composition material granulated in the earlier described manner was subjected to injection molding in a mold according to ASTM (American Society for Testing & Materials) standards for obtaining sample bonded magnets.

The results of the foregoing experiments are tabulated in Tables 1, 2, 3 and 4 given below.

TABLE 1

| | | Magnetic characteristics | | | Mechanical strength | | |
|---|---|---|---|---|---|---|---|
| Kinds of additive packing bag | Sample No. | Residual magnetic flux density Br (G) | Coercive force iHC (Oe) | Maximum energy product BHmax (MGOe) | Tensile strength ($Kg/cm^3$) ASTM-D638 | Bending strength ($Kg/cm^3$) ASTM-D790 | Impact strength (Kg · cm/cm) ASTM-D-256 |
| Polyamide resin | 1 | 2220 | 3000 | 1.18 | 233 | 398 | 5.35 |
| | 2 | 2230 | 3000 | 1.18 | 225 | 395 | 5.36 |
| | 3 | 2230 | 3000 | 1.18 | 224 | 396 | 5.28 |
| | 4 | 2240 | 3020 | 1.19 | 232 | 398 | 5.30 |
| | 5 | 2220 | 3000 | 1.18 | 230 | 393 | 5.29 |
| | $\bar{x}$ | 2228 | 3004 | 1.18 | 229 | 396 | 5.32 |
| | Deviation (%) | 0.8 | 0.6 | 0.8 | 3.9 | 1.3 | 1.5 |
| Polypropylene resin | 1 | 2220 | 3000 | 1.17 | 220 | 388 | 5.34 |
| | 2 | 2230 | 3000 | 1.18 | 222 | 392 | 5.29 |
| | 3 | 2210 | 3000 | 1.17 | 225 | 390 | 5.29 |
| | 4 | 2230 | 3000 | 1.18 | 228 | 395 | 5.27 |
| | 5 | 2220 | 3000 | 1.17 | 225 | 395 | 5.28 |
| | $\bar{x}$ | 2222 | 3000 | 1.17 | 224 | 392 | 5.29 |
| | Devia- | 0.9 | 0 | 0.8 | 3.5 | 1.8 | 1.3 |

TABLE 1-continued

| Kinds of additive packing bag | Sample No. | Magnetic characteristics: Residual magnetic flux density Br (G) | Coercive force iHC (Oe) | Maximum energy product BHmax (MGOe) | Mechanical strength: Tensile strength (Kg/cm³) ASTM-D638 | Bending strength (Kg/cm³) ASTM-D790 | Impact strength (Kg·cm/cm) ASTM-D-256 |
|---|---|---|---|---|---|---|---|
| | tion (%) | | | | | | |

n = 5

TABLE 2

| Amount of composition charged with respect to tank volume (%) | Kneading time (min.) | Deviation in specific gravity (%) | Deviation in magnetic characteristics (%): Residual magnetic flux density Br | Coercive force iHC | Maximum energy product BHmax | Rotary blade motor load current (A) |
|---|---|---|---|---|---|---|
| 92 | 10 | 1.5 | 1.5 | 1 | 1.1 | 90 |
| 91 | 15 | 1.2 | 1.1 | 0.9 | 1 | 88 |
| 90 | 18 | 0.9 | 0.8 | 0.6 | 0.8 | 80 |
| 89 | 22 | 0.9 | 0.9 | 0.6 | 0.8 | 70 |
| 88 | 25 | 1.0 | 0.9 | 0.7 | 0.8 | 70 |

n = 10

TABLE 3

| Set temperature at high speed rotation A-B points (°C.) | Low speed revolutions (rpm) | Time required for reaching set temperatures at high speed rotation (min.) | Mechanical strength: Tensile strength $\bar{x}$ (Kg/cm³) | Bending strength $\bar{x}$ (Kg/cm³) | Impact strength $\bar{x}$ (Kg·cm/cm) |
|---|---|---|---|---|---|
| 235 | 880 | 22 | 218 | 383 | 3.95 |
| 230 | 880 | 19 | 225 | 390 | 4.80 |
| 225 | 880 | 17 | 230 | 395 | 5.30 |
| 220 | 880 | 15 | 229 | 397 | 5.32 |
| 215 | 880 | 14 | | | |

n = 10

TABLE 4

| Blade revolutions (rpm) High speed | Low speed | Set temperatures at high speed rotation °C. (A-B points) | Set temperatures at low speed rotation D point (°C.) | Deviation in specific gravity (%) | Time required from point C to point D (sec.) | Deviation in mechanical strength: Tensile strength $\bar{x}$ (%) | Bending strength $\bar{x}$ (%) | Impact strength $\bar{x}$ (%) |
|---|---|---|---|---|---|---|---|---|
| 1100 | 700 | 225 | 230 | 2.0 | 60 | 1.5 | 1.0 | 1.4 |
| 1100 | 700 | 225 | 225 | 1.8 | 30 | 1.2 | 1.0 | 1.3 |
| 1100 | 700 | 225 | 220 | 1 | 20 | 0.8 | 0.6 | 0.8 |

n = 10

As seen from the above Table 1, with respect to the bags for accommodating the additive, there was not much difference in the magnetic characteristics and mechanical strength, if materials having a good compatibility or mutual solubility with the matrices were employed.

Meanwhile, regarding the amount of composition material to be charged with respect to the volume of the tank, it is seen that, if the charged amounts are above 91%, considerable deviations tend to take place in the specific gravity and magnetic characteristics of the composition material to be kneaded, as compared to the charged amounts below 90%, thus making it impossible to effect uniform dispersion. Also, if the charged amounts exceed 91%, the load current of the motor for the stirring blade increases, thus imposing an increased burden on the facilities.

Concerning the temperatures for change-over from the high speed rotation to the low speed rotation (i.e. the temperatures at A to B points) shown in Table 3, it is observed that, with respect to the change-over of temperatures at above 10° C. from the melting point of the matrices, the time required for the kneading tends to be increased. Owing to the high temperature of the material, the change-over temperature is lowered from the maximum kneading temperature at the range higher than the melting point by 10° C. due to thermal deterioration, etc. of the matrices. Moreover, in kneading at the melting point, the matrices were not sufficiently melted, and the kneading was limited to a mixing, thus making it impossible to effect the granulation.

With respect to the set temperature (point D) of the composition material to be discharged from the tank at the low speed rotation shown in Table 4, deviations of specific gravity and mechanical strength are increased at temperatures above 10° C. from the melting points of the matrices. Such deviations are considered to have resulted from the excessive kneading effected due to the prolonged kneading time during the low speed rotation.

Furthermore, problems as described hereinbelow may take place unless the low speed operation is effected at revolutions below 80% of the high speed revolutions.

1. Since the temperature at the point C in FIG. 1 is raised, with the state of kneading being immediately reached, the time for the points C to D is reduced for discharging without a sufficient kneading, and therefore, uniform dispersion can not be effected.

2. Owing to the decrease of the time up to the points C to D, stable control during the discharging can not be achieved.

3. Due to the approach to the temperature of the points A to B, thermal deterioration of the matrices takes place.

4. Since the revolutions of the stirring blade are increased, excessive shearing heat is applied to the composition material during dispersion, thus giving rise to the thermal deterioration of the matrices.

From the above problems, it is seen that the thermal stability and uniform dispersion may not be achieved unless the low speed revolutions are less than 80% of the high speed revolutions. Consequently, stabilization of specific gravity, mechanical strength and magnetic characteristics of the kneaded material can not be expected.

EXAMPLE 2

For the composition material of EXAMPLE 2, there were employed 86 weight % of strontium ferrite of EXAMPLE 1, 13 weight % of EVA (ethylene-vinyl acetate copolymer) having a melting point of 55° C. for the matrices, and the same weight % of the same additive as in EXAMPLE 1. Meanwhile, for the bag for packing the additive, a bag of EVA 0.2 mm in thickness and 400 $cm^3$ in volume was employed. The materials were subjected to the automatic weighing and mixing in the similar manner as in EXAMPLE 1 so as to occupy 89% of the tank volume of the kneading apparatus of EXAMPLE 1, and were charged into the tank, which was then completely closed.

Subsequently, high speed rotation at 1,100 r.p.m. was imparted to the stirring blade until the temperature of the composition material reached 65° C. When the temperature was stabilized, the revolutions of the stirring blade were lowered to a low speed rotation of 600 r.p.m. with the operation continued until the temperature of the composition material reached 61° C., and was further stabilized. Thereafter, the composition material thus treated was discharged out of the tank and subjected to granulation with the device having the cooling and crushing functions as described with reference to EXAMPLE 1.

On the other hand, a bag of polyethylene was used for the bag in which the additive was packed, and the kneading and granulation were effected by the same method as described above.

Furthermore, the kneading and granulation were also carried out by the same process as described above through variations of the mixing weight of the composition material, revolutions at the low speed rotation of the stirring blade, and the temperature of the material to be reached during the high speed rotation.

By using the composition material granulated in the above described manner, measurements were taken on the magnetic characteristics and specific gravity according to the method described with reference to EXAMPLE 1, the results of which are shown in Tables 5, 6 and 7 below.

TABLE 5

| Kinds of additive packing bag | Sample No. | Magnetic characteristics: Residual magnetic flux density Br (G) | Coercive force iHC(Oe) | Maximum energy product BHmax(MGOe) |
|---|---|---|---|---|
| EVA resin | 1 | 2210 | 3050 | 1.23 |
| | 2 | 2220 | 3040 | 1.23 |
| | 3 | 2200 | 3040 | 1.22 |
| | 4 | 2190 | 3040 | 1.22 |
| | 5 | 2220 | 3040 | 1.22 |
| | $\bar{x}$ | 2204 | 3042 | 1.22 |
| | Deviation (%) | 0.5 | 0.3 | 0.8 |
| Polyethylene resin | 1 | 2200 | 3040 | 1.22 |
| | 2 | 2210 | 3050 | 1.23 |
| | 3 | 2190 | 3030 | 1.21 |
| | 4 | 2190 | 3040 | 1.22 |
| | 5 | 2200 | 3040 | 1.22 |
| | $\bar{x}$ | 2198 | 3040 | 1.22 |
| | Deviation (%) | 0.9 | 0.7 | 1.6 |

n = 5

TABLE 6

| Amount of composition charged with respect to tank volume (%) | Kneading time (min.) | Deviation in specific gravity (%) | Deviation in magnetic characteristics (%): Residual magnetic flux density Br | Coercive force iHC | Maximum energy product BHmax | Rotary blade motor load current (A) |
|---|---|---|---|---|---|---|
| 92 | 10 | 2.0 | 1.7 | 1.2 | 1.5 | 70 |
| 91 | 12 | 2.1 | 1.6 | 0.7 | 1.2 | 66 |
| 90 | 15 | 1.4 | 0.9 | 0.5 | 0.8 | 50 |
| 89 | 17 | 1.5 | 0.8 | 0.5 | 0.7 | 50 |
| 88 | 18 | 1.5 | 0.9 | 0.5 | 0.7 | 47 |

n = 10

TABLE 7

| Set temperature at high speed rotation A–B points (°C.) | Set temperature at low speed rotation D point (°C.) | Deviation in specific gravity (%) | Time required from point C to point D (sec.) |
|---|---|---|---|
| 65 | 70 | 2.2 | 37 |
| " | 65 | 1.8 | 20 |
| " | 60 | 1.6 | 16 |

n = 10

COMPARATIVE EXPERIMENT 1

With the composition material of EXAMPLE 1 being employed at the same mixing ratio, a pressure type kneader was employed for the kneading. The revolutions of the stirring blade were set to 48 r.p.m. for front blade and 32 r.p.m. for rear blade. The kneading tank was heated up to 210° C.

The above composition material was weighed and mixed so as to occupy 95% of the tank volume, and the kneading was effected by charging said composition little by little into the tank. After continuing further kneading for 20 seconds from the time point where the temperature of the composition reached 230° C., the composition material was discharged. Thereafter, the composition material thus kneaded was spread into a thin layer, and in the state where the surface of the layer was hardened, crushing by a crusher was effected.

With the use of the composition material thus crushed, samples were evaluated by the method of EXAMPLE 1, the results of which are shown in Table 8 below.

TABLE 10

| | | Deviation in residual magnetic flux density (Gauss) according to number of kneadings | | | | | |
|---|---|---|---|---|---|---|---|
| | | 1st | 10th | 20th | 30th | 40th | 50th |
| EXAMPLE 1 | $\bar{x}$ | 2230 | 2229 | 2228 | 2227 | 2229 | 2229 |
| | Deviation (%) | 0.8 | 0.8 | 0.8 | 0.9 | 0.8 | 0.8 |
| Comparative experiment 1 | $\bar{x}$ | 2220 | 2218 | 2219 | 2215 | 2213 | 2213 |
| | Deviation (%) | 2.8 | 2.7 | 2.5 | 2.8 | 2.6 | 2.7 |

As is clear from the foregoing description, the method of manufacturing the composition for bonded magnets according to the present invention is particularly characterized as follows.

1. Since deviation in the magnetic characteristics and mechanical strength is extremely small from lot to lot in a continuous kneading over a long period of time, bonded magnets having stable physical properties and characteristics may be obtained.

2. There is no deterioration of resin which forms the matrices, and therefore, bonded magnets superior in strength are available.

3. The kneading conditions for a continuous kneading over a long period are sufficiently stable, and thus, automation of work at high productivity has been made possible through reduction of kneading time.

4. Owing to the small abrasion in the kneading apparatus, expenses required for countermeasures against such abrasion have been appreciably reduced.

TABLE 8

| | | Magnetic characteristics | | | Mechanical strength | | |
|---|---|---|---|---|---|---|---|
| Kinds of additive packing bag | Sample No. | Residual magnetic flux density Br(G) | Coercive force iHC(Oe) | Maximum energy product BHmax (MGOe) | Tensile strength (Kg/cm³) ASTM-D638 | Bending strength (Kg/cm³) ASTM-D790 | Impact strength (Kg · cm/cm) ASTM-D256 |
| Polyamide resin | 1 | 2250 | 3000 | 1.20 | 210 | 375 | 5.25 |
| | 2 | 2190 | 2950 | 1.17 | 208 | 365 | 5.18 |
| | 3 | 2200 | 2980 | 1.17 | 200 | 376 | 5.20 |
| | 4 | 2230 | 3000 | 1.18 | 218 | 368 | 5.28 |
| | 5 | 2200 | 3000 | 1.18 | 212 | 370 | 5.15 |
| | $\bar{x}$ | 2214 | 2986 | 1.18 | 210 | 371 | 5.21 |
| | Deviation (%) | 2.7 | 1.7 | 2.5 | 8.5 | 2.9 | 2.5 |
| Polypropylene resin | 1 | 2170 | 2970 | 1.17 | 215 | 365 | 5.19 |
| | 2 | 2200 | 2990 | 1.18 | 209 | 377 | 5.22 |
| | 3 | 2190 | 2990 | 1.18 | 208 | 368 | 5.30 |
| | 4 | 2230 | 3000 | 1.19 | 217 | 366 | 5.25 |
| | 5 | 2180 | 2980 | 1.17 | 208 | 372 | 5.15 |
| | $\bar{x}$ | 2194 | 2986 | 1.18 | 211 | 370 | 5.22 |
| | Deviation (%) | 2.7 | 1 | 1.7 | 4.2 | 3.2 | 2.9 |

n = 5

Meanwhile, in Tables 9 and 10 given below, respective items in EXAMPLE 1 and Comparative experiment were tabulated for comparison.

TABLE 9

| | | Item | | | | | | | |
|---|---|---|---|---|---|---|---|---|---|
| | | Magnetic characteristics | | | Mechanical strength | | | | |
| | | Residual magnetic flux density Br(G) | Coercive force iHC(Oe) | Maximum energy product BHmax (MGOe) | Tensile strength (Kg/cm³) ASTM-D638 | Bending strength (Kg/cm³) ASTM-D790 | Impact strength (Kg · cm/cm) ASTM-D256 | Deviation in specific gravity (%) | Material preparing time (min.) |
| EXAMPLE 1 | $\bar{x}$ | 2228 | 3004 | 1.18 | 229 | 397 | 5.32 | 3.45 | |
| | Deviation (%) | 0.8 | 0.6 | 0.8 | 3.9 | 0.8 | 1.5 | 0.9 | 25 |
| Comparative experiment 1 | $\bar{x}$ | 2214 | 2986 | 1.18 | 210 | 371 | 5.21 | 3.43 | |
| | Deviation (%) | 2.7 | 1.7 | 2.5 | 8.5 | 2.9 | 2.5 | 2.9 | 45 |

n = 10

Although the present invention has been fully described by way of example with reference to the accompanying drawing, it is to be noted that various changes and modifications will be apparent to those skilled in the art. Therefore, unless otherwise such changes and modifications depart from the scope of the present invention, they should be construed as included therein.

What is claimed is:

1. A method of preparing a composition for manufacturing bonded magnets, which comprises the steps of:

(a) introducing a ferrite-resin composition comprising ferrite powder and a solid resin material bonding agent for said powder into a closable kneading apparatus equipped with a stirring blade member, the amount of said ferrite-resin composition being less than 90% of the available interior volume of said kneading apparatus, (b) closing said kneading apparatus, (c) mixing the components of said ferrite-resin composition by rotating said stirring blade member at a sufficiently high speed to raise the temperature within said kneading apparatus selectively above the melting of softening point of said resin material, to form a uniform dispersion of the components of said ferrite-resin composition, (d) transferring said uniform dispersion, at a temperature no higher than a temperature 10° C. higher than said melting or softening point of said resin material, to a tank, and (e) subjecting said uniform dispersion to cooling, stirring and crushing in said tank, to form granules of said uniform dispersion.

2. A method as claimed in claim 1, further comprising heating said closable mixing apparatus, to a temperature below the melting point of said resin material, prior to introducing said ferrite-resin composition into said container.

3. A method as claimed in claim 1, wherein, after step c and before step d, the speed of said stirring blade member is reduced to less than 80% of the speed employed in step c, thus lowering the temperature within said kneading apparatus.

4. A method as claimed in claim 1, wherein said ferrite-resin composition further includes an additive, said additive being preliminarily packed in a bag having mutual solubility with said resin material so as to be subsequently introduced into said closable kneading apparatus.

5. A method as claimed in claim 4, wherein said ferrite-resin composition includes 86 weight % of strontium ferrite having an average particle diameter of about 1μ, 13 weight % of polyamide resin having a melting point of 215° C. and a molecular weight of 23,000, and, as said additive, 0.5 weight % of a phthalate and 0.5 weight % of a metallic soap packed in a bag of polyamide resin 0.2 mm in thickness and 400 $cm^3$ in volume.

6. A method as claimed in claim 4, wherein said ferrite-resin composition includes 86 weight % of strontium ferrite having an average particle diameter of about 1μ, 13 weight % of ethylene-vinyl acetate copolymer having a melting point of 55° C., and, as said additive, 0.5 weight % of a phthalate and 0.5 weight % of a metallic soap packed in a bag of a resin material 0.2 mm in thickness and 400 $cm^3$ in volume.

7. A method as claimed in claim 6, wherein said bag for said additive is made of an ethylene-vinyl acetate copolymer.

8. A method as claimed in claim 6, wherein said bag for said additive is made of polyethylene.

9. A composition prepared by the method of claim 1, 2, 3 or 4.

* * * * *